Patented July 5, 1938

2,122,812

UNITED STATES PATENT OFFICE 2,122,812

HYDROGENATION OF UNSATURATED ETHERS AND ESTERS

Herbert P. A. Groll, Berkeley, and James Burgin, Oakland, Calif., assignors to Shell Development Company, San Francisco, Calif., a corporation of Delaware No Drawing. Application April 8, 1935,
Serial No. 15,286

14 Claims. (Cl. 260—106)

This invention relates to a process for effecting the catalytic hydrogenation of unsaturated ethers and esters of the class consisting of the esters of unsaturated alcohols with carboxylic acids and the ethers of unsaturated alcohols which contain an unsaturated tertiary carbon atom, said process comprising reacting such an unsaturated compound with hydrogen in the presence of a hydrogenation catalyst.

More particularly this invention is concerned with a practical, economical and broadly applicable method for effecting the substantial hydrogenation of the unsaturated ethers and esters of unsaturated alcohols possessing at least one olefinic linkage between two carbon atoms of aliphatic character at least one of which is tertiary and linked to a carbinol group or to a carbon atom which in turn is linked to a carbinol group. The unsaturated alcohols of this type as well as the unsaturated ethers and esters derived from them, by effecting the etherification or esterification of a carbinol group thereof, are too unstable to permit their substantial hydrogenation employing the ordinary hydrogenation catalysts and conditions of temperature and pressure known to be suitable for effecting the hydrogenation of the more stable unsaturated alcohols and ethers and esters thereof which do not possess this specific structure. In the application of the known methods of effecting hydrogenation of unsaturated compounds to the unsaturated ethers and esters with which our invention is concerned, we have found that, under conditions of temperature and pressure at which the reaction occurs at a practical rate, the unsaturated compounds suffer fission and/or molecular rearrangement to such an extent that only insignificant yields of the corresponding saturated compounds are attained. Due to the instability of such ethers and esters, no practical method has hitherto been proposed for effecting their substantial conversion to the corresponding saturated compounds.

Now, we have found that, in accordance with the principles of this invention, the readily rearrangeable and/or decomposable ethers and esters of unsaturated alcohols may be substantially completely hydrogenated at practical rates while undesirable side reactions such as fission, rearrangement, condensation, etc., are substantially avoided. Our process comprises selecting a hydrogenation catalyst of such activity that in its presence the hydrogenation can be effected at a practical rate under conditions at which substantial rearrangement and/or decomposition of the unsaturated compound is avoided. In other words, if a hydrogenation catalyst of suitable initial activity is selected, the process is executed under conditions of temperature, pressure and contact time favorable to rapid hydrogenation, while the same conditions are not sufficiently severe to induce undesirable side reactions.

The unsaturated compounds which may be hydrogenated in accordance with this invention possess at least one olefinic bond between two carbon atoms of aliphatic character, and at least one ether oxygen radical or carboxylic ester group. The unsaturated carboxylic acid esters may comprise a normal or iso unsaturated alkyl chain, while the unsaturated ethers will comprise an iso unsaturated alkyl chain containing an unsaturated tertiary carbon atom, which chain may or may not be linked to a cyclic radical as of the aromatic, alicyclic and heterocyclic series, or the unsaturated alkyl chain may comprise part of an alicyclic structure. The carbon atom of the unsaturated alcohol radical which is linked to the ether oxygen atom or to the carboxylic ester group is preferably of primary or secondary character. The unsaturated ethers and/or esters may possess one or a plurality of olefinic bonds. A single compound may possess a plurality of ether oxygen atoms or carboxylic ester groups, or a single compound may possess an ether oxygen atom as well as a carboxylic ester group. The successful execution of our invention is not dependent on the source of the unsaturated compound treated nor on the method by which a suitable unsaturated ether or ester is prepared. The compounds treated are derivatives of unsaturated alcohols; however, they need not be prepared from unsaturated alcohols, but may, if desired, be prepared by other suitable methods, for example, from the equivalent halides. The unsaturated ethers which possess an unsaturated tertiary carbon atom linked to a carbon atom which in turn is linked to the ether oxygen radical are conveniently prepared from the unsaturated chlorides obtained by the chlorination of tertiary olefines. The esters containing an unsaturated tertiary carbon atom linked to the ester group may be prepared by effecting the esterification of the unsaturated alcohols obtained from tertiary olefines by chlorination and subsequent hydrolysis of the unsaturated chlorides.

A preferred group of unsaturated ethers and esters, particularly suitable for hydrogenation in accordance with the principles of our invention, may be represented by the formula R—O—R', wherein R represents an organic radical comprising an unsaturated alkyl chain linked to the oxygen atom by a saturated carbon atom, said alkyl chain containing an olefinic linkage between two aliphatic carbon atoms at least one of which is tertiary, that is, linked to three other carbon atoms and R' represents an organic radical with a free carbon linkage or the group

R" representing hydrogen when the unsaturated compound is an ester of formic acid, or an organic radical with a free carbon linkage when the unsaturated compound is an ester of a carboxylic acid or suitable substitution product thereof containing more than one carbon atom. The organic radicals represented by R' and R'' may be alkyl, alkenyl, alkoxy, aralkyl, aralkoxy, carbocyclic, heterocyclic, aryloxy, or other organic radicals such as substitution products of the above listed radicals, it only being essential that said radicals possess a free carbon linkage.

Excellent results are obtained with those unsaturated ethers and esters, embraced by the above general formula, which may be represented, respectively, by the more specific structural groupings

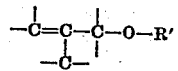

and

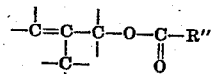

The loose bonds of the above groupings may be taken up by hydrogen atoms and/or by alkyl, alkenyl, alkoxy, aralkyl, aralkoxy, carbocyclic, heterocyclic, aryloxy and/or other suitable organic radicals which may or may not be further substituted, or the loose bonds may be taken up by suitable inorganic substituents. The loose bonds may also be taken up by carbinol groups and/or hydroxyl radicals, however, it is understood that a hydroxyl radical is not linked to an unsaturated carbon atom or to a carbon atom already linked to a hydroxyl group. Generally, we do not desire to execute our invention employing unsaturated ethers and/or esters which contain sulphur, phosphorus or halogen atoms, due to the fact that the presence of these elements in a free or combined form may detrimentally influence the life and activity of the hydrogenation catalyst employed.

The following list includes members of a preferred group of unsaturated ethers which may be hydrogenated by our method.

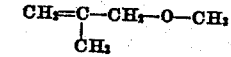
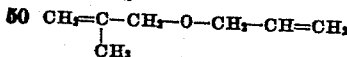
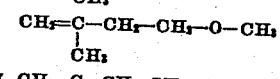
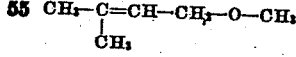
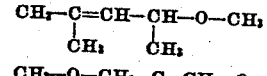
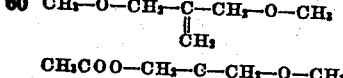
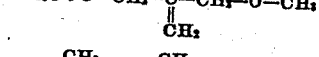
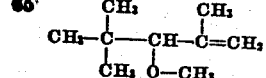
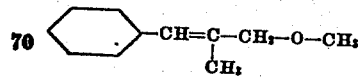
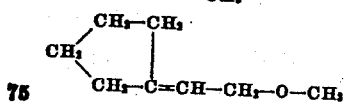
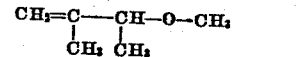
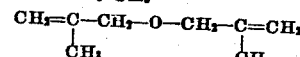
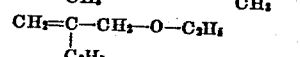
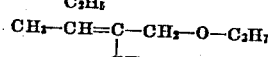
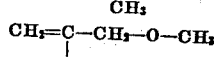
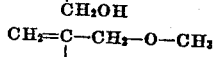
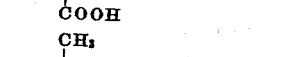
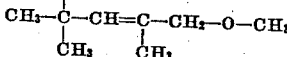
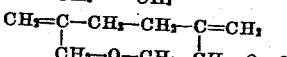
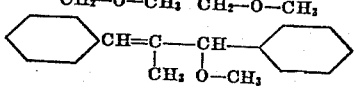

and the like and their homologues, analogues and suitable substitution products.

It is to be understood that the unsaturated esters contemplated are the esters of unsaturated alcohols of the type herein described with saturated or unsaturated, mono- or poly-carboxylic acids. We are not concerned with the esterification products of saturated alcohols.

Suitable unsaturated esters are embraced by the group which includes compounds such as

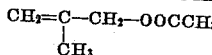
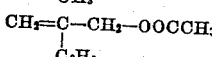
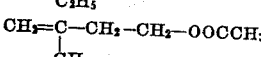
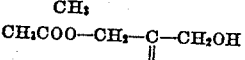
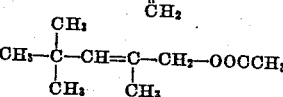
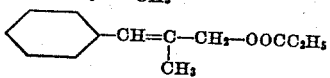
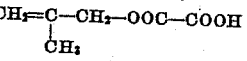
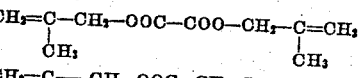
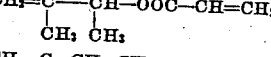
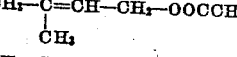
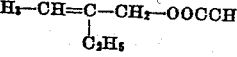
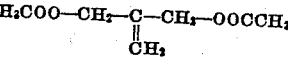
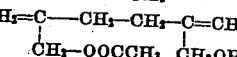
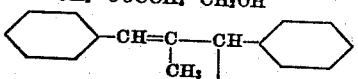
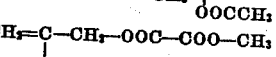

and the like as well as their homologues, analogues and suitable substitution products.

In accordance with the principles of this invention, the hydrogenation is effected in the presence of a selected hydrogenation catalyst. The choice of a suitable catalyst will be dependent on its specific activity and on the specific activity of the unsaturated compound to be treated and its stability against decomposition and/or rearrangement under conditions of temperature and pressure at which substantially complete hydrogenation can occur at a substantial rate.

In the great majority of cases, excellent results may be obtained by employing the relatively inexpensive, readily prepared and easily regenerated base metal catalysts which possess the desired degree of activity. For example, base metal catalysts comprising metals such as copper, chromium, thallium, nickel, iron, cobalt and the like may be particularly active and efficacious catalysts when employed in a finely divided state or deposited on a suitable carrier. The term "base metal" is used to designate those metals which, in contrast to the noble metals, are oxidized to an appreciable extent on exposure to air. Pyrophoric nickel, iron and cobalt catalysts are particularly suitable for our purpose. They possess the desired initial activity which permits rapid hydrogenation at relatively low temperatures and pressures and, in addition, the catalysts of this preferred group are readily prepared and regenerated and they substantially retain their initial catalytic activity over relatively long periods of use.

The metallic catalysts may be prepared by any suitable method and used severally or in combination. The catalysts are preferably preformed and employed per se or deposited upon an inert substance or carrier such as pumice, calcium carbonate, silica gel, kieselguhr, charcoal and the like. The catalytic activity of a selected catalyst may be considerably enhanced by incorporating with it small quantities of other substances capable of acting as promoters. For example, in some cases, a catalyst more efficacious than pure nickel may be obtained by adding small quantities of one or more suitable alkaline-acting metal compounds to a precipitated nickel hydroxide before reducing it to metallic nickel. Suitable promoters include high melting and difficultly reducible oxygen-containing compounds, in particular, the oxides and oxygen-containing salts of elements such as the alkaline earth and rare earth metals, beryllium, magnesium, aluminum, copper, thorium, manganese, uranium, vanadium, niobium, tantalum, chromium, boron, zinc and titanium. A particularly suitable group of promoters includes the difficultly soluble phosphates, molybdates, tungstates and selenates of the above listed metals, or the reduction products, containing oxygen, of such compounds, as for example, the corresponding selenites.

For purposes of control and economy, the suitable base metal catalysts are employed whenever their use is feasible, however, it is to be understood that we may advantageously employ catalysts, possessing the desired activity, selected from the group comprising the noble metals such as silver, gold, platinum, palladium, osmium, ruthenium, rhodium, irridium and the like. We may also advantageously employ catalyst mixtures comprising one or more base metals with one or more noble metals.

We have found that a very desirable pyrophoric nickel catalyst of great activity may be prepared by effecting the reduction or thermal decomposition of nickel salts of volatile organic acids. For example, a pyrophoric nickel catalyst particularly suitable in the execution of our invention may be prepared by effecting the reduction or decomposition of nickelous formate. The nickelous formate may be reduced to pyrophoric nickel metal by heating it to a temperature of from about 200° C. to 350° C. in an atmosphere of hydrogen, or the nickelous formate may be dissolved or suspended in a suitable inert liquid such as a petroleum oil, hydrocarbon and the like and the mixture heated to the decomposition temperature of the nickelous formate in the presence or absence of hydrogen or other suitable reducing gases.

The unsaturated ethers and esters may be treated severally or mixtures comprising a plurality of species of unsaturated ethers and/or esters may be hydrogenated without resorting to separation of the constituent compounds. The unsaturated compounds may in some cases be advantageously hydrogenated in the presence of suitable relatively inert substances. For example, the unsaturated compound may be dissolved or suspended in an inert medium such as an oil, hydrocarbon, ether, ester and the like. In some instances, the hydrogenation may be effected in the presence of substances which will be dehydrogenated under the conditions of hydrogenation of the unsaturated compound treated. In general, the presence of water in moderate amounts is not detrimental to the reaction. Accordingly, water-containing mixtures may be treated without resorting to costly drying operations.

The temperature at which our process may be effectively executed will be dependent upon the activity of the specific catalyst selected, upon the stability of the unsaturated compound treated, upon the contact time of the reactants and upon the effective pressure of hydrogen in the system. Due to the fact that undesirable side reactions are usually favored at the higher temperatures, we prefer to operate at temperatures not generally exceeding 200° C. Higher temperatures may be employed, in some cases, if other factors such as contact time and pressure are suitably adjusted and care is exercised to avoid the excessive occurrence of side reactions while effecting substantial hydrogenation.

Although our invention is preferably executed with the unsaturated compound in the liquid phase, it is to be understood that vapor phase methods may also be resorted to, particularly with the more stable unsaturated compounds, when very active catalysts are employed.

The hydrogenation may be effected at any desirable pressure. In the majority of cases, moderately elevated pressures may be advantageously employed. The hydrogen may be utilized in a pure or substantially pure state or we may resort to the use of suitable hydrogen-containing gases. Care should be taken to avoid the use of gases or gaseous mixtures containing substances that may have a detrimental influence on the activity and life of the catalyst.

The liquid phase hydrogenation may be effected in the following manner. An unsaturated ether, ester or mixed ether-ester of the type herein described, or a suitable mixture comprising such an unsaturated compound is charged to a suitable reaction vessel which is preferably equipped with means for agitating its contents as by mechanical stirring, and means whereby its contents may be heated and cooled. A selected catalyst, in the required amount, may be added to the contents of the reaction vessel in any suitable manner. When pyrophoric metal catalysts are employed, the catalytic material is preferably added in such a manner that substantial exposure to the air is avoided. The hydrogen or hydrogen-containing gas is preferably added from a supply tank in communication with the reaction vessel, in an amount and at a rate sufficient to maintain the desired pressure in the system. The rate of hydrogenation may be materially accelerated by agitating the contents of the reaction vessel while hydrogen is being added.

The reaction, for the cases tested, was found to be exothermic. In many cases, and particularly when a pyrophoric metal catalyst is employed, the reaction may be initiated at room temperature; however, when necessary or desirable the same may be initiated at elevated temperatures. The conditions of operation may vary within certain limits as herein described, the conditions in any case being adjusted with respect to the catalyst and the unsaturated compound treated so as to permit hydrogenation at an optimum rate while substantially avoiding side reactions. The temperature of the reaction mixture may be controlled by heating and/or cooling means and/or by regulating the rate of admittance and the pressure of hydrogen in the system. If the heat supplied by the exothermicity of the reaction is not sufficient to maintain the desired reaction temperature, we may resort to the use of external heating means.

When vapor phase methods of hydrogenation are resorted to, the vapors of the unsaturated compound in admixture with hydrogen, a suitable hydrogen-containing gas or a gaseous mixture or substance capable of liberating hydrogen under the conditions of operation, may be passed continuously at the desired space velocity over the catalytic material maintained at the desired temperature. The fluids discharged from the reaction vessel may be cooled and the condensed liquid conducted to a recovery stage wherein recovery or separation of the products and reactants may be effected by distillation, extraction or other suitable means. Any of the unsaturated compound recovered may be reutilized in the same or another reaction unit.

For the purpose of more clearly illustrating preferred methods of executing our invention, reference will be had to the following specific examples.

Example I

A pyrophoric nickel metal catalyst was prepared by reducing nickelous formate suspended in a neutral petroleum oil.

About 100 gm. (0.793 mol.) of diisobutenyl ether

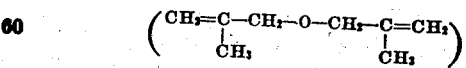

were charged to an iron reaction vessel and about 5 gm. of the nickel catalyst were added thereto. The contents of the reaction vessel were vigorously agitated while hydrogen was applied at a gauge pressure of from about 40 to 50 lbs. per sq. in. The hydrogenation was effected at a temperature of from 120° C. to 130° C.

When the addition reaction had practically ceased, the mixture was cooled, discharged from the reaction vessel and the catalyst separated therefrom by filtration. The filtrate was fractionated. The reaction product was diisobutyl ether which boiled in a temperature range of from 122° C. to 123° C. About 95% of the diisobutenyl ether was converted to the corresponding saturated ether.

Example II

About 100 gm. (0.88 mol.) of isobutenyl acetate

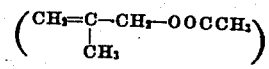

were charged to an iron reaction vessel equipped with means for agitating, heating and cooling its contents and in communication with a hydrogen supply tank. The hydrogenation was effected in the presence of about 5 gm. of nickel catalyst. The contents of the autoclave were vigorously agitated while hydrogen was applied at a gauge pressure of about 40 lbs. per sq. in. The hydrogenation was effected at a temperature of about 100° C. When the absorption of hydrogen had practically ceased, the reaction mixture was cooled, discharged from the reactor and the catalyst separated from the liquid reaction product by filtration. The filtrate was fractionated.

The main reaction product was isobutyl acetate which boiled in the temperature range of from about 116° C. to 117° C. under atmospheric pressure. A conversion of about 96% of the applied unsaturated ester was effected.

Example III

An active iron-copper catalyst was prepared in the following manner: A mixture consisting of about 400 gm. of crystalline ferric nitrate and about 77.4 gm. of cupric nitrate was placed in a quartz dish and heated until all the water was driven off and no more nitric oxide was evolved. The residue was placed in a glass tube and heated to about 250° C. while a gaseous mixture consisting of equal parts of carbon monoxide and hydrogen was passed through it under atmospheric pressure. This treatment was continued until the reduction was substantially complete as indicated by the presence of hydrocarbons in the exit gas.

About 500 cc. of ethyl isobutenyl ether

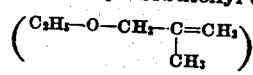

were charged to an autoclave provided with a mechanical stirrer and means for heating its contents. About 20 gm. of the iron-copper catalyst were added to the liquid in the autoclave, the catalyst being kept in an inert atmosphere during the addition. The mixture was agitated and heated while hydrogen was applied at a superatmospheric pressure. At a temperature of about 125° C. and a hydrogen pressure of about 50 atmospheres (gauge), the reaction was complete in about 2 hours. During this time hydrogen was added as required to maintain the pressure substantially constant.

When the hydrogenation was substantially complete, the reaction vessel was cooled and its contents discharged and filtered to separate the catalyst from the liquid material. The filtrate was fractionated. The product was ethyl isobutyl ether, which was obtained in a practically quantitative yield.

Example IV

About 400 cc. of methyl isopropenyl carbinol isobutyrate

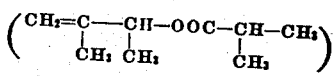

were charged to a suitable autoclave, equipped with means for heating and agitating its contents, and about 5 gm. of an active nickel catalyst were added. The mixture was agitated and heated to a temperature of about 85° C. while hydrogen was applied at a gauge pressure of about 20 atmospheres. The temperature was maintained at about 85° C. and hydrogen was added as required to maintain the pressure in the autoclave.

When the reaction was substantially complete, the operation was terminated and the contents of the autoclave cooled and discharged therefrom. The catalyst was separated by filtration and the filtrate fractionated. The reaction product was methyl isopropyl carbinol isobutyrate which was obtained in a substantially quantitative yield.

Example V

About 200 gm. of di-tiglyl oxalate

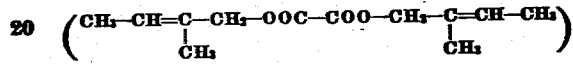

were charged to a shaking autoclave and about 1 gm. of palladium black was added thereto. The reaction vessel was agitated while hydrogen was applied at a gauge pressure of about 2 atmospheres. The hydrogenation reaction was initiated at room temperature. Due to the exothermicity of the reaction, the temperature of the reaction mixture rose to about 80° C. When the hydrogenation was nearly complete, the hydrogen pressure was increased to about 10 atmospheres in order to effect substantially complete conversion.

The cooled contents of the reaction vessel were discharged therefrom, the catalyst separated and the liquid product fractionated. A substantially quantitative yield of the corresponding di-amyl oxalate was obtained.

It will be evident that our invention may be executed in a batch, intermittent or continuous manner. A single species of an unsaturated ether or ester may be treated or we may hydrogenate mixtures comprising a plurality of species of unsaturated ethers and/or esters without resorting to separation of the constituents. In the latter case, a reaction product consisting of a mixture of hydrogenated products may be obtained. Such a mixture may be employed per se for any suitable purpose or the various species of ethers and/or esters may be separated by some suitable means such as extraction, distillation and the like.

While we have in the foregoing described in some detail the preferred embodiments of our invention and some variants thereof, it will be understood that this is only for the purpose of making the invention more clear and that the invention is not to be regarded as limited to the details of operation described, nor is it dependent on the soundness or accuracy of the theories advanced as to the advantageous results attained. On the other hand, the invention is to be regarded as limited only by the terms of the accompanying claims, in which it is our intention to claim all novelty therein as broadly as possible in view of the prior art.

We claim as our invention:

1. A process for the hydrogenation of an unsaturated compound of the class consisting of the ethers and carboxylic acid esters of unsaturated alcohols possessing an unsaturated tertiary carbon atom linked by a single bond to a carbinol group which comprises reacting the unsaturated compound with hydrogen at a temperature below about 200° C. and in the presence of a catalyst selected from the group consisting of the base metal and noble metal hydrogenation catalysts which have a substantial hydrogenation activity at temperatures below 200° C.

2. A process for the hydrogenation of an unsaturated compound of the class consisting of the ethers and carboxylic acid esters of unsaturated alcohols possessing an unsaturated tertiary carbon atom linked by a single bond to a carbinol group which comprises reacting the unsaturated compound with hydrogen in the presence of a base metal hydrogenation catalyst at a temperature below about 200° C.

3. A process for the hydrogenation of an unsaturated compound of the class consisting of the ethers and carboxylic acid esters of unsaturated alcohols possessing an unsaturated tertiary carbon atom linked by a single bond to a carbinol group which comprises reacting the unsaturated compound with hydrogen in the presence of a base metal catalyst of pyrophoric character at a temperature below about 200° C.

4. A process for the hydrogenation of an unsaturated compound of the class consisting of the ethers and carboxylic acid esters of unsaturated alcohols possessing an unsaturated tertiary carbon atom linked by a single bond to a carbinol group which comprises reacting the unsaturated compound with hydrogen in the presence of a pyrophoric metal catalyst of the class consisting of nickel, iron and cobalt at a temperature below about 200° C.

5. A process for the hydrogenation of an ether of an unsaturated alcohol possessing an unsaturated tertiary carbon atom linked by a single bond to a carbinol group which comprises reacting the unsaturated ether with hydrogen in the presence of a pyrophoric base metal catalyst at a temperature below about 200° C.

6. A process for the hydrogenation of a carboxylic acid ester of an unsaturated alcohol possessing an unsaturated tertiary carbon atom linked by a single bond to a carbinol group which comprises reacting the unsaturated ester with hydrogen in the presence of a pyrophoric base metal catalyst at a temperature below about 200° C.

7. A process for the hydrogenation of an unsaturated compound of the class consisting of the ethers and carboxylic acid esters of unsaturated monohydric primary alcohols containing an unsaturated tertiary carbon atom linked by a single bond to the carbinol group which comprises reacting the unsaturated compound with hydrogen in the presence of a pyrophoric base metal catalyst at a temperature below about 200° C.

8. A process for the hydrogenation of an unsaturated ether of the formula

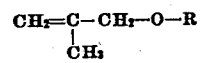

wherein R represents a hydrocarbon radical, which comprises reacting the unsaturated ether with hydrogen in the presence of a pyrophoric nickel metal catalyst at a temperature below about 200° C.

9. A process for the hydrogenation of an unsaturated carboxylic acid ester of the formula

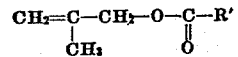

wherein R' represents a substituent of the class consisting of hydrogen and hydrocarbon radicals, which comprises reacting the unsaturated ester with hydrogen in the presence of a pyrophoric nickel metal catalyst at a temperature below about 200° C.

10. A process for effecting the hydrogenation of diisobutenyl ether to diisobutyl ether which comprises reacting diisobutenyl ether, in the liquid phase, with hydrogen in the presence of a pyrophoric nickel metal catalyst.

11. A process for effecting the hydrogenation of isobutenyl acetate to isobutyl acetate which comprises reacting isobutenyl acetate, in the liquid phase, with hydrogen in the presence of a pyrophoric nickel metal catalyst.

12. A process for the liquid phase hydrogenation of an unsaturated compound of the class consisting of the ethers and carboxylic acid esters of unsaturated alcohols possessing an unsaturated tertiary carbon atom linked by a single bond to a carbinol group which comprises reacting the liquid unsaturated compound with hydrogen in the presence of a pyrophoric base metal hydrogenation catalyst at a temperature below about 200° C.

13. A process for the liquid phase hydrogenation of an ether of an unsaturated alcohol possessing an unsaturated tertiary carbon atom linked by a single bond to a carbinol group which comprises reacting the liquid unsaturated ether with hydrogen in the presence of a pyrophoric base metal catalyst at a temperature below about 200° C.

14. A process for the liquid phase hydrogenation of an ester of an unsaturated alcohol possessing an unsaturated tertiary carbon atom linked by a single bond to the carbinol group which comprises reacting the liquid unsaturated ester with hydrogen in the presence of a pyrophoric base metal catalyst at a temperature below about 200° C.

HERBERT P. A. GROLL.
JAMES BURGIN.